US010025461B2

(12) United States Patent
Liu et al.

(10) Patent No.: US 10,025,461 B2
(45) Date of Patent: Jul. 17, 2018

(54) GESTURE INPUT FOR ITEM SELECTION

(71) Applicant: Yahoo!, Inc., Sunnyvale, CA (US)

(72) Inventors: Agnes Liu, Walnut, CA (US); Albert Song, Santa Clara, CA (US); Guilherme Neumann, San Francisco, CA (US)

(73) Assignee: OATH INC., New York, NY (US)

( * ) Notice: Subject to any disclaimer, the term of this patent is extended or adjusted under 35 U.S.C. 154(b) by 442 days.

(21) Appl. No.: 14/247,690

(22) Filed: Apr. 8, 2014

(65) Prior Publication Data
US 2015/0286346 A1 Oct. 8, 2015

(51) Int. Cl.
| | | |
|---|---|---|
| *G06F 3/00* | (2006.01) | |
| *G06F 3/0482* | (2013.01) | |
| *G06F 3/0488* | (2013.01) | |
| *G06F 3/0484* | (2013.01) | |
| *H04M 1/725* | (2006.01) | |

(52) U.S. Cl.
CPC .......... *G06F 3/0482* (2013.01); *G06F 3/0484* (2013.01); *G06F 3/04883* (2013.01); *H04M 1/72547* (2013.01); *H04M 2250/22* (2013.01)

(58) Field of Classification Search
CPC . G06F 3/04883; G06F 3/0481–3/0489; H04M 1/00
See application file for complete search history.

(56) References Cited

U.S. PATENT DOCUMENTS

| | | | | |
|---|---|---|---|---|
| 6,414,698 B1* | 7/2002 | Lovell | ................... | G06F 9/4443 |
| | | | | 345/472 |
| 6,603,493 B1* | 8/2003 | Lovell | ................... | G06F 9/4443 |
| | | | | 345/660 |
| 6,825,860 B1* | 11/2004 | Hu | ........................ | G06F 3/0481 |
| | | | | 345/660 |
| 6,950,993 B2* | 9/2005 | Breinberg | ................. | G06F 8/38 |
| | | | | 715/788 |
| 6,983,424 B1* | 1/2006 | Dutta | ................... | G06F 3/04817 |
| | | | | 715/790 |
| 7,631,276 B2* | 12/2009 | Gruen | ................. | G06F 3/04883 |
| | | | | 715/818 |
| 7,934,156 B2* | 4/2011 | Forstall | ............... | G06F 3/04883 |
| | | | | 345/169 |
| 8,365,097 B2* | 1/2013 | Jager | ..................... | G06F 3/0482 |
| | | | | 715/810 |
| 8,407,590 B1* | 3/2013 | Shamis | ............. | G06F 17/30905 |
| | | | | 715/273 |

(Continued)

*Primary Examiner* — Steven B Theriault
(74) *Attorney, Agent, or Firm* — Cooper Legal Group, LLC

(57) ABSTRACT

Many applications may display information through lists. For example, an email application may display a current visual interface comprising a list of emails. A gesture input may be received for an item within the item list. Responsive to receiving the gesture input, the item may be selected. In an example, the item list may be transitioned into an editing mode based upon the gesture input. While in the editing mode, context indicators (e.g., indicating whether an email item has been read or is unread) may be modified (e.g., shrunk) and/or selection indicators may be displayed for items within the item list. A selection indicator may be selected to select a corresponding item. In this way, gesture input (e.g., single gesture) may be used to select items and/or to transition the item list into the editing mode without transitioning away from the item list.

20 Claims, 10 Drawing Sheets

(56) References Cited

U.S. PATENT DOCUMENTS

| | | | | |
|---|---|---|---|---|
| 8,595,645 B2* | 11/2013 | Boettcher | G06F 3/0485 715/702 |
| 8,610,682 B1* | 12/2013 | Fulcher | G06F 3/0482 345/173 |
| 8,707,201 B1* | 4/2014 | Aradhye | G06F 17/3053 715/204 |
| 8,713,469 B2* | 4/2014 | Park | G06F 3/0482 345/173 |
| 8,743,148 B2* | 6/2014 | Gegner | G06F 3/0481 345/619 |
| 8,793,591 B1* | 7/2014 | Coleman | G06F 3/0482 715/751 |
| 8,812,058 B2* | 8/2014 | Lee | H04M 1/274525 345/173 |
| 8,910,068 B2* | 12/2014 | Shin | G06F 3/04883 715/765 |
| 8,972,903 B2* | 3/2015 | James | G06F 1/1643 345/173 |
| 9,058,092 B2* | 6/2015 | Rogers | G06F 3/04817 |
| 9,081,496 B2* | 7/2015 | Cho | G06F 3/0485 |
| 9,176,657 B2* | 11/2015 | Tumwattana | G06F 3/0485 |
| 9,195,389 B2* | 11/2015 | Park | G06F 3/0482 |
| 9,197,590 B2* | 11/2015 | Beausoleil | H04L 51/14 |
| 9,232,043 B2* | 1/2016 | Park | H04M 1/72583 |
| 9,244,594 B2* | 1/2016 | Jiang | G06F 3/0484 |
| 9,317,177 B2* | 4/2016 | Gao | G06F 3/04817 |
| 9,389,770 B2* | 7/2016 | Bang | G06F 3/04817 |
| 9,405,437 B2* | 8/2016 | Park | G06F 3/0482 |
| 9,411,501 B2* | 8/2016 | Yamamoto | G06F 3/0488 |
| 9,495,091 B2* | 11/2016 | Park | G06F 3/0488 |
| 9,507,448 B2* | 11/2016 | Park | G06F 3/0482 |
| 2002/0178191 A1* | 11/2002 | Sielken | G06F 3/0482 715/234 |
| 2005/0004989 A1* | 1/2005 | Satterfield | G06Q 10/107 709/206 |
| 2005/0144568 A1* | 6/2005 | Gruen | G06F 3/04883 715/822 |
| 2008/0074399 A1* | 3/2008 | Lee | G06F 3/0482 345/173 |
| 2008/0165136 A1* | 7/2008 | Christie | G06F 3/0482 345/173 |
| 2008/0250354 A1* | 10/2008 | Park | G06F 3/0482 715/845 |
| 2009/0044141 A1* | 2/2009 | Hayashi | G06F 3/04817 715/772 |
| 2009/0093277 A1* | 4/2009 | Lee | H04M 1/274525 455/566 |
| 2009/0228807 A1* | 9/2009 | Lemay | G06F 3/04817 715/752 |
| 2009/0278806 A1* | 11/2009 | Duarte | G06F 3/0416 345/173 |
| 2009/0282332 A1* | 11/2009 | Porat | G06F 3/0482 715/702 |
| 2010/0039399 A1* | 2/2010 | Kim | G06F 3/0482 345/173 |
| 2010/0082759 A1* | 4/2010 | Nalliah | G06F 3/0482 709/206 |
| 2010/0134425 A1* | 6/2010 | Storrusten | G06F 3/0425 345/173 |
| 2010/0299599 A1* | 11/2010 | Shin | G06F 3/0482 715/702 |
| 2010/0311445 A1* | 12/2010 | Kim | G06F 3/0485 455/466 |
| 2011/0010672 A1* | 1/2011 | Hope | G06F 3/04817 715/841 |
| 2011/0084921 A1* | 4/2011 | Kang | G06F 3/041 345/173 |
| 2011/0099507 A1* | 4/2011 | Nesladek | G01C 21/265 715/780 |
| 2011/0131521 A1* | 6/2011 | Cho | G06F 3/016 715/772 |
| 2011/0161853 A1* | 6/2011 | Park | G06F 3/0488 715/769 |
| 2011/0163970 A1* | 7/2011 | Lemay | G06F 3/04883 345/173 |
| 2011/0202878 A1* | 8/2011 | Park | G06F 3/0482 715/825 |
| 2011/0219332 A1* | 9/2011 | Park | H04M 1/72583 715/808 |
| 2012/0290946 A1* | 11/2012 | Schrock | G06Q 10/107 715/752 |
| 2013/0019174 A1* | 1/2013 | Gil | G06F 3/04812 715/711 |
| 2013/0174089 A1* | 7/2013 | Ki | G06F 3/0488 715/810 |
| 2013/0204946 A1* | 8/2013 | Forstall | G06Q 10/107 709/206 |
| 2013/0222435 A1* | 8/2013 | Choi | G06F 3/0482 345/684 |
| 2013/0227483 A1* | 8/2013 | Thorsander | G06F 3/04842 715/821 |
| 2013/0239060 A1* | 9/2013 | Kang | G06F 3/0488 715/835 |
| 2014/0062925 A1* | 3/2014 | Park | G06F 3/0486 345/173 |
| 2014/0143738 A1* | 5/2014 | Underwood, IV | H04L 51/38 715/863 |
| 2014/0157182 A1* | 6/2014 | Kim | G06F 3/04883 715/780 |
| 2014/0165003 A1* | 6/2014 | Branton | G06F 3/0488 715/835 |
| 2014/0223347 A1* | 8/2014 | Seo | G06F 3/0482 715/769 |
| 2014/0282254 A1* | 9/2014 | Feiereisen | G06F 3/04842 715/835 |
| 2014/0304613 A1* | 10/2014 | Coe | G06F 3/04842 715/752 |
| 2014/0344249 A1* | 11/2014 | Magistrado | G06F 17/30967 707/722 |
| 2015/0169068 A1* | 6/2015 | Plagemann | G06F 3/017 345/156 |
| 2016/0054887 A1* | 2/2016 | Tumwattana | G06F 3/0488 715/810 |
| 2016/0124598 A1* | 5/2016 | Yamahara | G06F 3/0482 715/830 |

* cited by examiner

GESTURE INPUT FOR ITEM SELECTION

BACKGROUND

Various types of items may be displayed to users through lists. In an example, a mobile email app may present email items through an email item list. In another example, a messaging app may present communication message items through a message item list. Because many computing devices, such as smart phones or tablets, have relatively small screens, less information and/or fewer details may be displayed for items within lists on such devices.

SUMMARY

In accordance with the present disclosure, a current visual interface comprising an item list may be displayed, such as a list of email items displayed through a mobile email app. Responsive to receiving a gesture input associated with a first item of the item list, the first item may be selected. The item list may be transitioned into an editing mode, such as after a gesture release input is detected. Selection indicators may be displayed for respective items within the item list while in the editing mode. Context indicators (e.g., indicating that an email has been read or is unread), may be modified while in the editing mode, such as shrunk to allot room for the selection indicators.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following disclosure provides a discussion of some types of computing scenarios in which the presently disclosed subject matter may be utilized.

1.1. Networking

Figure 1:
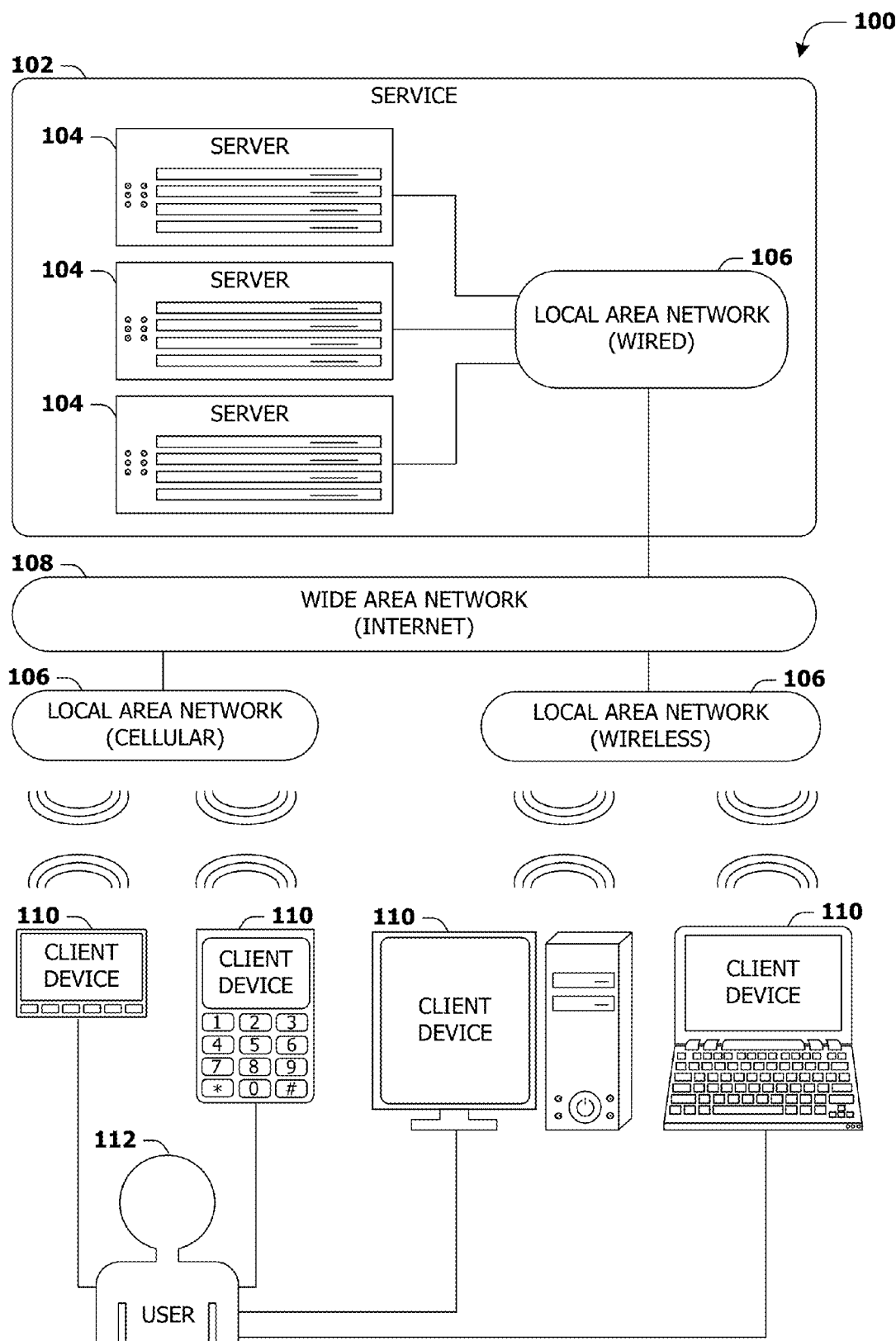
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks

106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
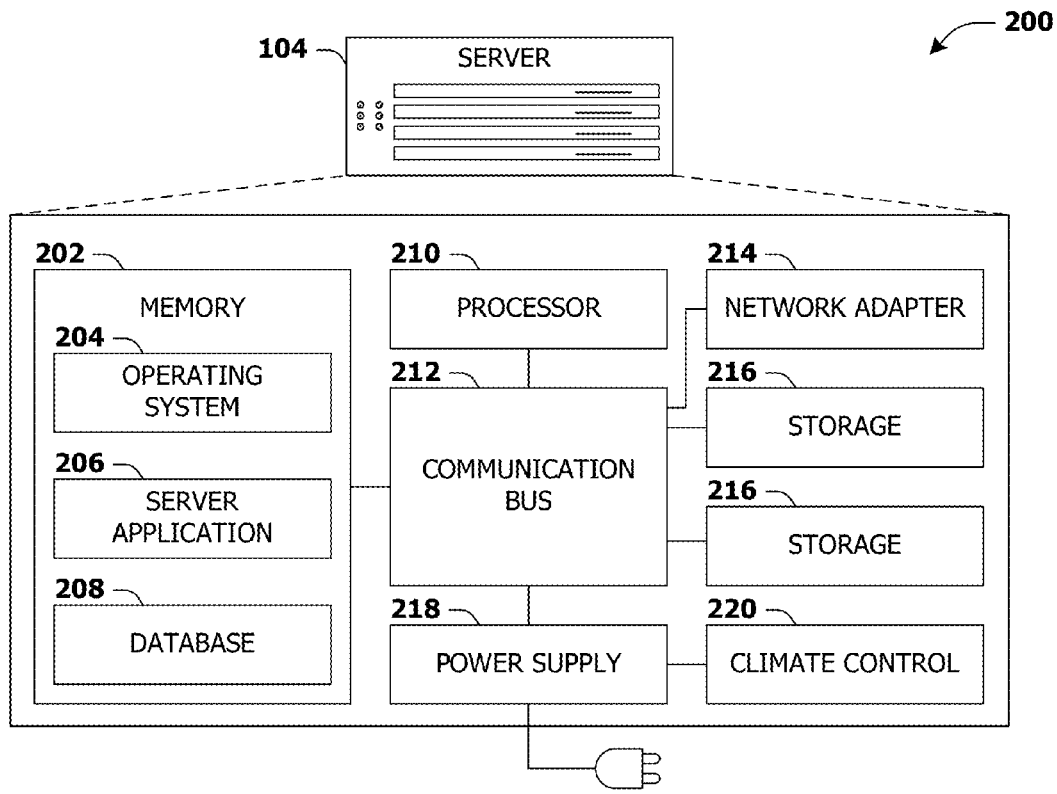
FIG. 2 is an illustration of a scenario involving an exemplary configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
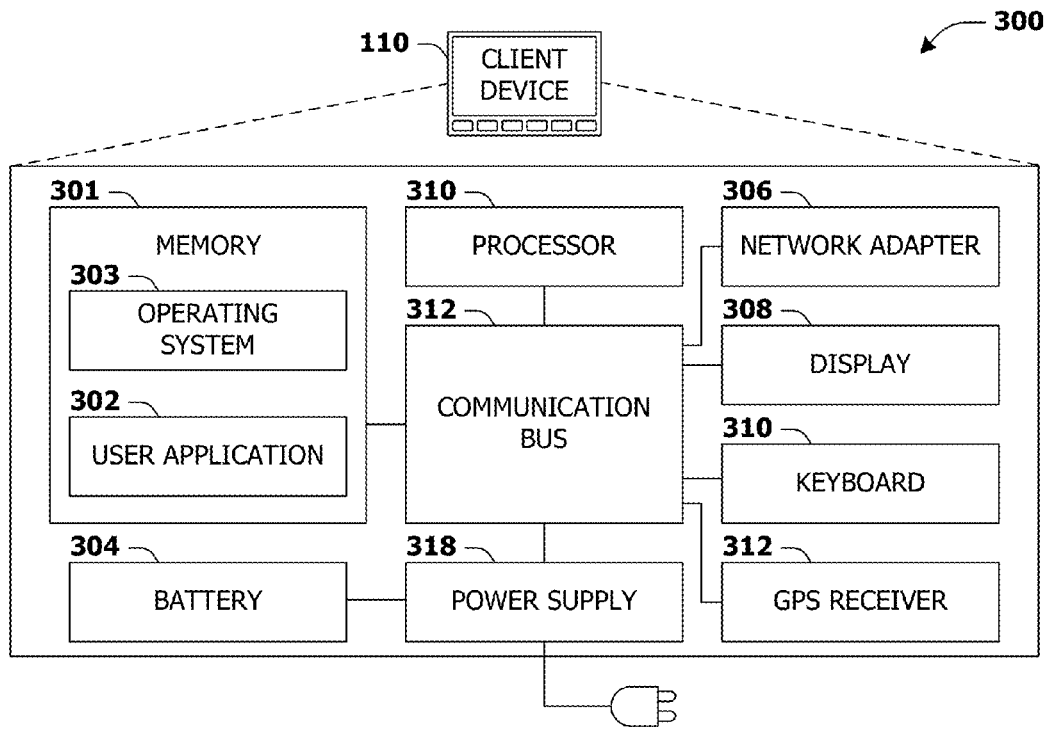
FIG. 3 is an illustration of a scenario involving an exemplary configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

1. Presented Techniques

One or more techniques and/or systems for item selection are provided herein. For example, a gesture input may be used to select an item from an item list and/or to transition the item list into an editing mode. A user may transition the item list into the editing mode using the gesture input without needing to provide an additional command such as an additional input to select an editing button to enter the editing mode. Using the gesture input to select the item may reduce visual occlusion of the item and/or other items within the item list (e.g., the item may be selected without using additional user interface real estate beyond an original area/size of the item before the gesture input). During the gesture input, display of the item list may be maintained so that the user may retain an original ability to view items and/or information associated with the items, such as context indicators (e.g., indicating that an email item has been read or is unread). It may be appreciated that a variety of input(s) may be detected as the gesture input, such as at least one of a swipe input, a long hold input, a degree of pressure, a hover input, a multi-finger swipe, a stylus input, a cursor input, gaze tracing input, a voice command, a tap input, a double tap input, etc.

Figure 4:
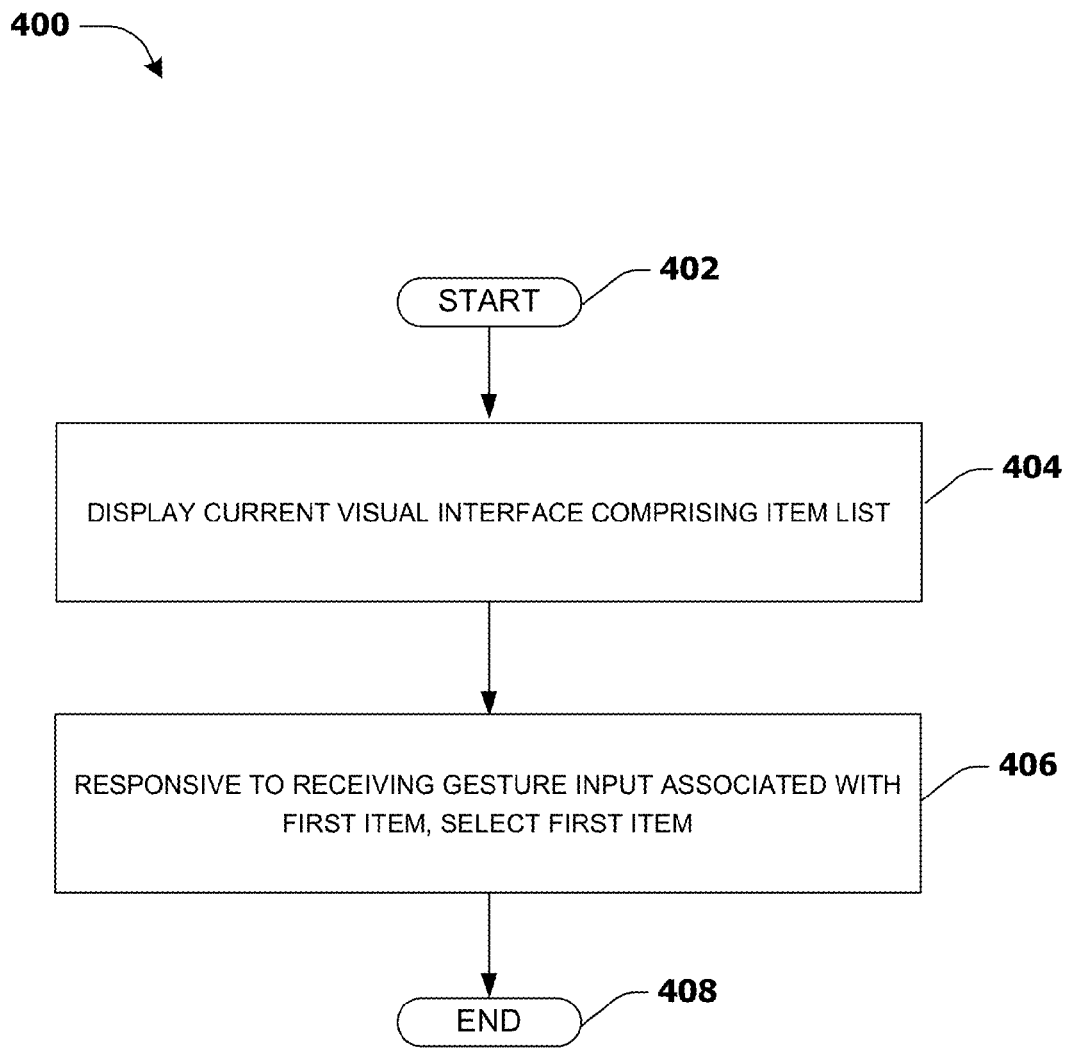
FIG. 4 is a flow chart illustrating an exemplary method of item selection.

An embodiment of item selection is illustrated by an exemplary method 400 of FIG. 4. At 402, the method starts. Visual interfaces may display various types of information through item lists. For example, a messaging interface of a mobile device may display message items through a message item list (e.g., messaging functionality associated with instant messages, social network messages, and/or any other type of messages). As provided herein, gesture input may be used to select items within an item list and/or to transition the item list into an editing mode.

At 404, a current visual interface may be displayed. The current visual interface may comprise an item list (e.g., the message item list). At 406, responsive to identifying a gesture input associated with a first item of the item list, the first item may be selected (e.g., based upon the gesture input moving the first item past a selection threshold). For example, a user may move (e.g., swipe) a dinner message item within the message item list. As the user moves (e.g., swipes) the dinner message item, a display position of the dinner message item may be modified from an original display position to a modified display position based upon a gesture direction of the gesture input (e.g., as the user swipes to the right, the dinner message item may be moved to the right, such that a portion of the dinner message item that would extend past the current visual interface may instead be hidden from view). As the display position of the dinner message item is modified, an action graphic and/or action text may be displayed for the dinner message item (e.g., "selection" or a checked box may become visible on the left side of the dinner message item as the dinner message item is moved to the right, which may provide the user with a visual indication that the dinner message item will be selected based upon the gesture input).

The display of the message item list may be maintained through the current visual interface during the gesture input (e.g., the user may retain an original ability to view message items within the message item list and/or contextual information associated with the message items such as context indicators indicating whether a message item has been read or is unread). The dinner message item may be selected without transitioning away from the current visual interface (e.g., as opposed to refreshing/reloading the current visual interface to an updated visual interface where the dinner message item is selected). Responsive to identifying a gesture release (e.g., a swipe release), the dinner message item may be returned to the original display position. In an example, a selection indicator for the dinner messages item may be displayed according to a selected state based upon the selection of the dinner message item. In an example, a context indicator may have been displayed for the dinner message item before the gesture input. Responsive to identifying the gesture release, the context indicator may be modified to create a modified context indicator (e.g., a size of the context indicator may be reduced so that the selection indictor may be prominently displayed to indicate that the message item list has been transitioned into an editing mode).

In an example, responsive to receiving the gesture input associated with the first item (e.g., and/or after identifying the gesture release), the message item list may be transitioned into an editing mode, such as a selection mode where the user may select message items within the message item list. Selection indicators may be displayed for the message items within the message item list. The selection indicator for the dinner message item may be displayed according to the selected state, while other selection indicators may be displayed according to an unselected state until selected. The user may select a selection indicator for a message item in order to select the message item. In this way, one or more selected message items may be identified. Responsive to transitioning the message item list into the editing mode, an editing task bar may be displayed within the current visual interface. An action (e.g., a delete action, a mark as read action, a move to destination action, or any other type of item action) may be selected from the editing task bar and may be performed for the one or more selected items. While in the editing mode, display of context indicators may be retained to indicate whether a message item has been read or is unread, but may be modified, such as shrunk, to indicate that the message item list is within the editing mode where the user may select message items using the selection indicators. At 408, the method ends.

Figure 5:
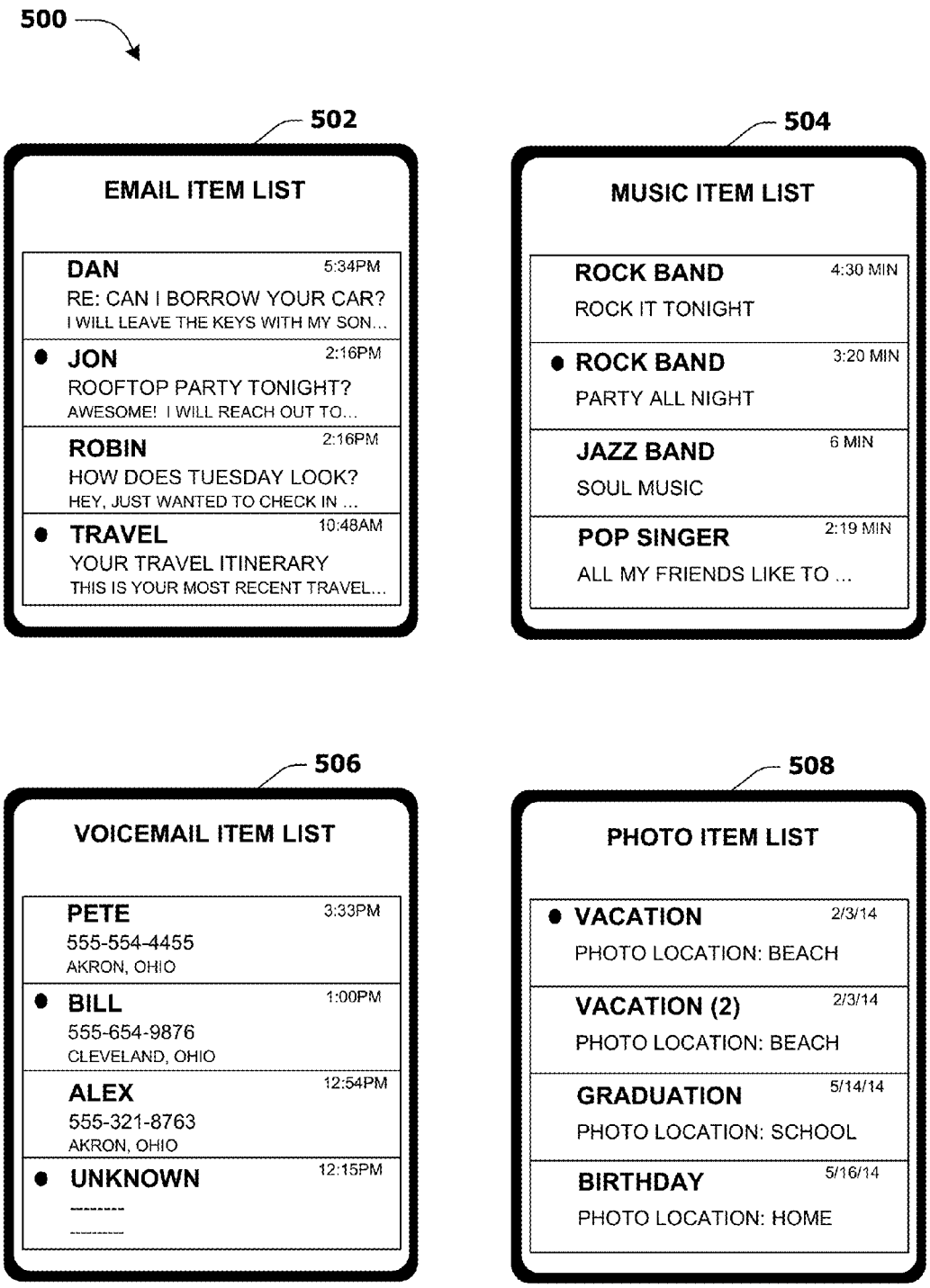
FIG. 5 is an illustration of an example of one or more item lists displayed through current visual interfaces.

FIG. 5 illustrates an example 500 of item lists displayed through current visual interfaces. In an example, an email item list 502 may be populated with one or more email items. In another example, a music item list 504 may be populated with one or more songs. In another example, a voicemail item list 506 may be populated with one or voicemail messages. In another example, a photo item list 508 may be populated with one or more photos. Context indicators (e.g., graphics such as dots) may be used to indicate various information about items (e.g., an unread message, a newly acquired song, an unheard voicemail, a favorite photo, etc.).

Figure 6A:
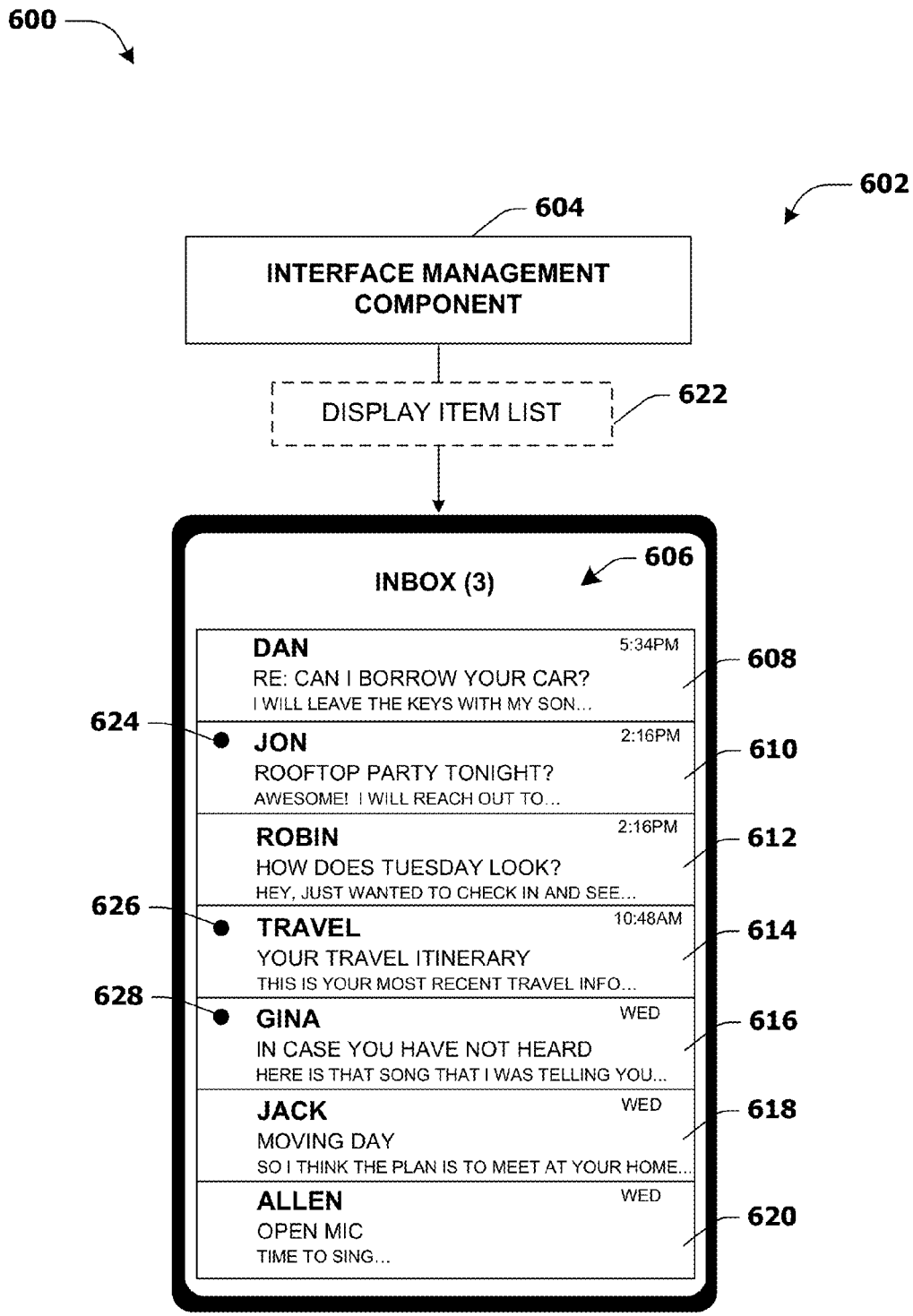
FIG. 6A is a component block diagram illustrating an exemplary system for item selection, where an item list is displayed.

FIGS. 6A-6E illustrate examples of a system 602 for item selection. FIG. 6A illustrates an example 600 of the system 602 comprising an interface management component 604. The interface management component 604 may be associated with a device hosting an email app. The email app may display an email item list 606 of an Inbox through a current visual interface. For example, a first email item 608, a second email item 610, a third email item 612, a fourth email item 614, a fifth email item 616, a sixth email item 618, and a seventh email item 620 may be displayed through the email item list 606. A first context indicator 624 for the second email item 610, a second context indicator 626 for the fourth email item 614, and a third context indicator 628 for the fifth email item 616 may be displayed according to a unread state to indicate that such email items have not yet been read by a user. A number "3" may be displayed at the top of the list to indicate that there are three unread messages in the Inbox.

Figure 6B:
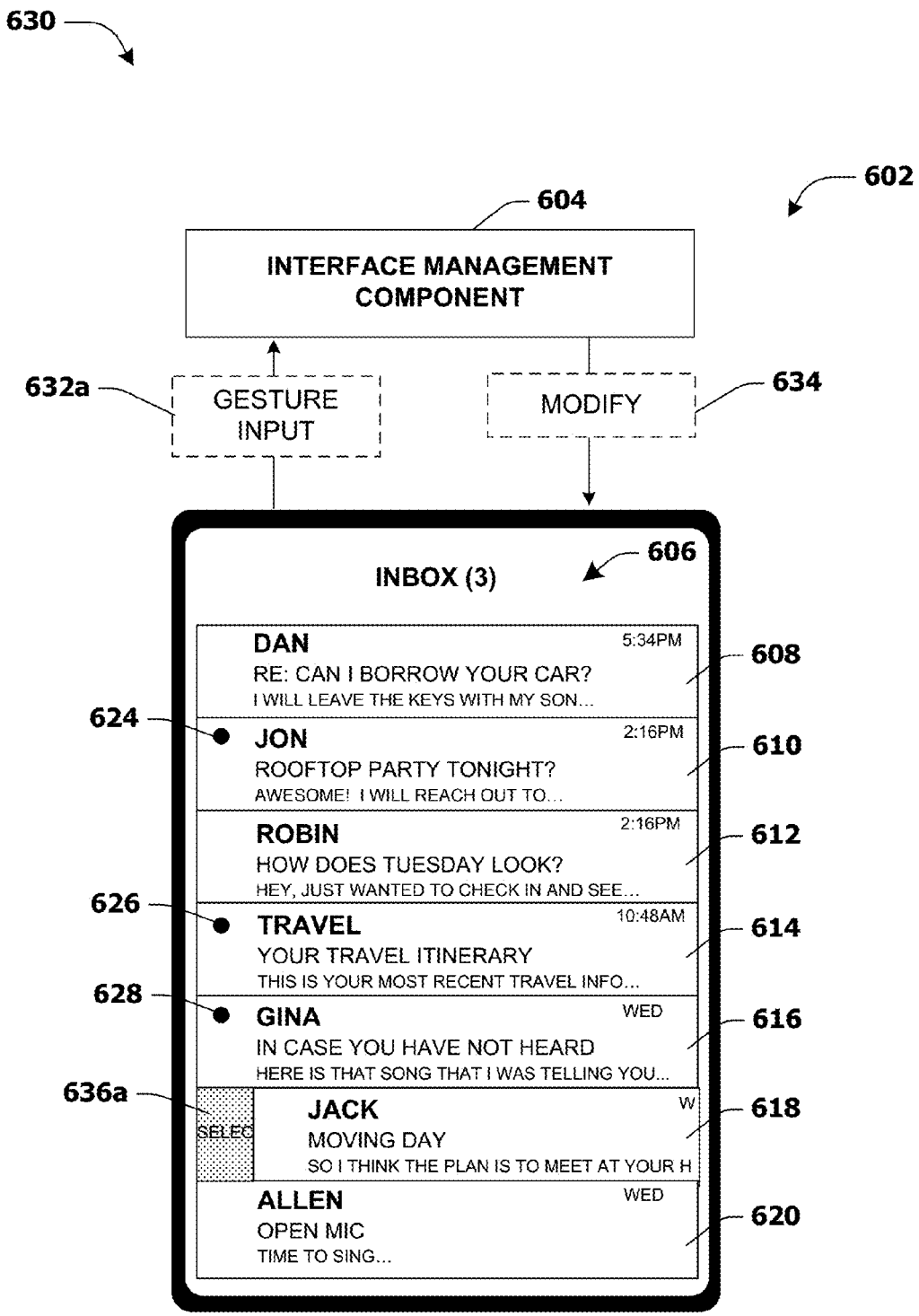
FIG. 6B is a component block diagram illustrating an exemplary system for item selection, where a gesture input is received.

FIG. 6B illustrates an example 630 of the interface management component 604 receiving a gesture input 632a. For example, the user may move (e.g., swipe) the sixth email item 618 towards the right, which may be received as the gesture input 632a. The interface management component 604 may modify 634 a display position of the sixth email item 618 to a first modified display position (e.g., the sixth email item 618 may be shifted to the right). In an example, a selection action text 636a or a portion thereof may be displayed for the sixth email item 618, which may provide an indication to the user that the gesture input 632a may be used to select the sixth email item 618.

Figure 6C:
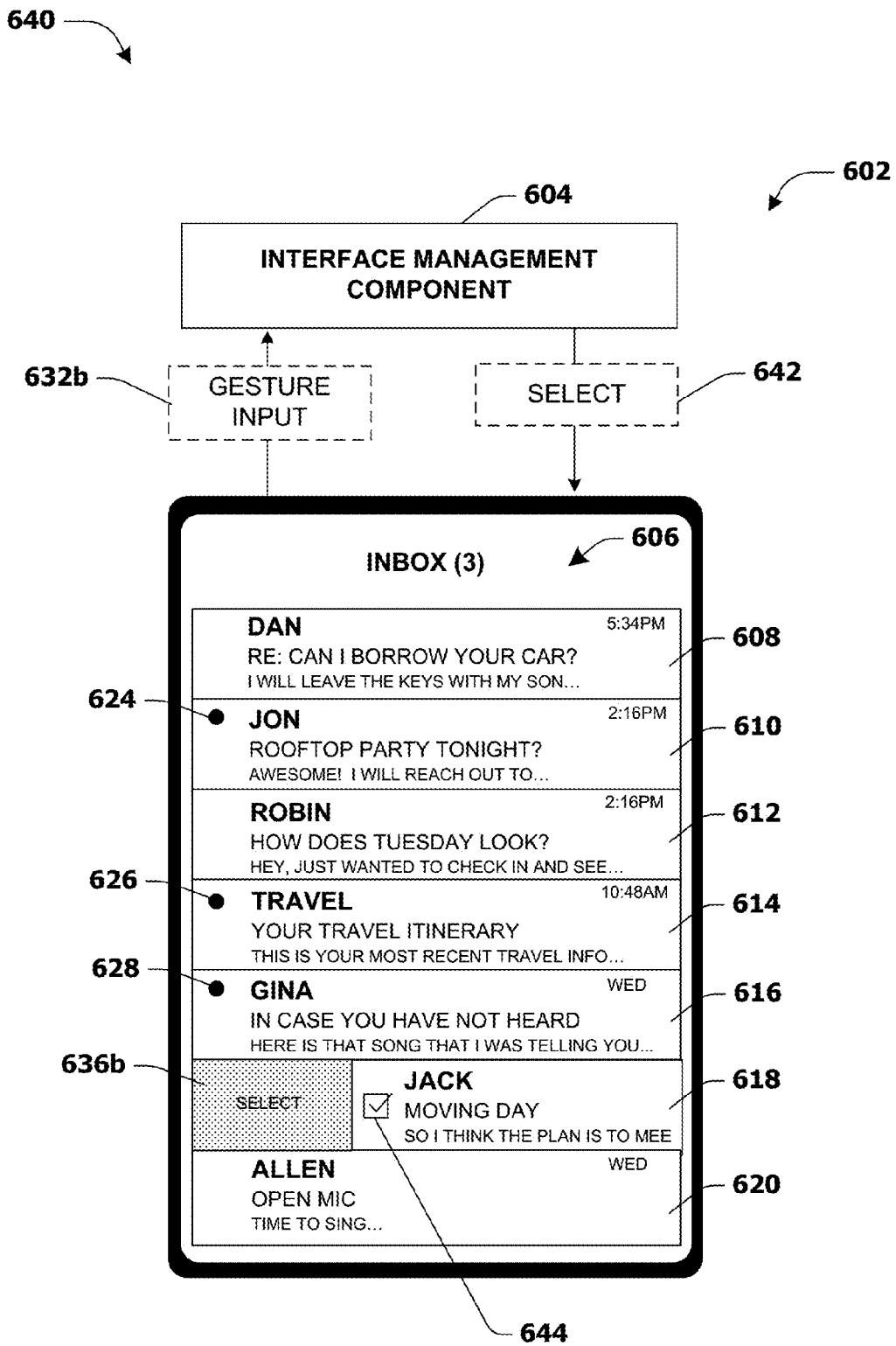
FIG. 6C is a component block diagram illustrating an exemplary system for item selection, where an item is selected based upon a gesture input.

FIG. 6C illustrates an example 640 of the interface management component 604 selecting 642 the sixth email item 618 based upon gesture input 632b. For example, the user may continue moving (e.g., swiping) the sixth email item 618 towards the right, which may be received as the gesture input 632b. The interface management component 604 may continue to move the sixth email item 618 to the right based upon the gesture input 632b. Display of the selection action text 636a may be expanded based upon the gesture input 632b, resulting in a selection action text 636b. Once the gesture input 632b triggers a selection threshold (e.g., the sixth email item 618 is moved, such as swiped, towards the right beyond a threshold distance), the interface management component 604 may select 642 the sixth email item 618. In an example, a selection indicator 644 may be displayed according to a selected state for the sixth email item 618.

Figure 6D:
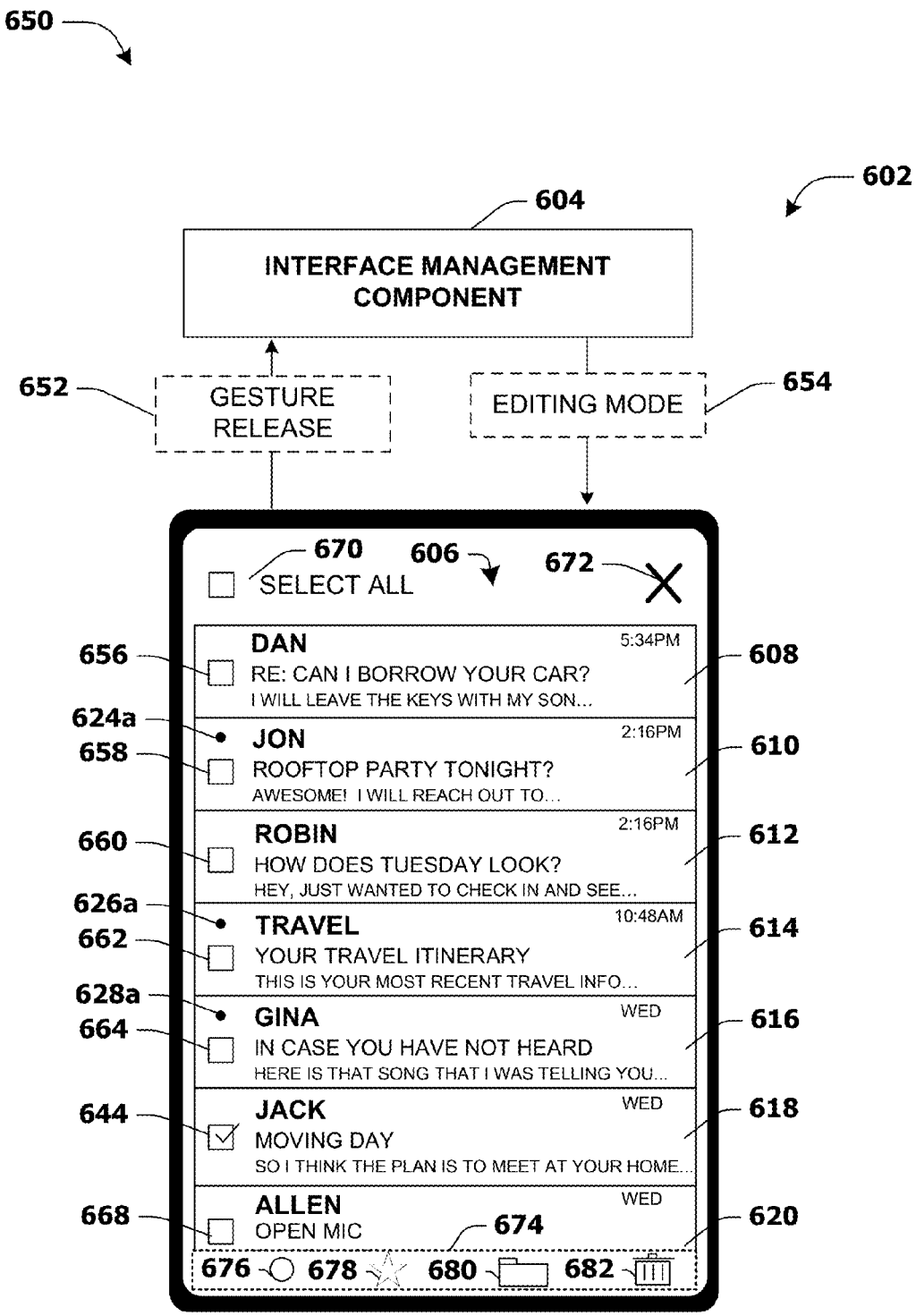
FIG. 6D is a component block diagram illustrating an exemplary system for item selection, where an item list is transitioned into an editing mode.

FIG. 6D illustrates an example 650 of the interface management component 604 transitioning the email item list 606 into an editing mode 654. For example, the interface management component 604 may identify a gesture release 652 associated with the sixth email item 618 (e.g., the sixth email item 618 was moved, such as swiped, all the way to the right or was released after passing the threshold distance). The interface management component 604 may return the sixth email item 618 to an original display position within the email item list 606. In an example, sizes of the first context indicator 624, the second context indicator 626, and the third context indicator 628 may be decreased based upon the transition of the email item list 606 into the editing mode 654, resulting in a modified first context indicator 624a, a modified second context indicator 626a, and a modified third context indicator 628a. Decreasing the sizes of the context indicators while in the editing mode 654 may indicate to the user that the email item list 606 is in the editing mode 654 and/or may free up screen real estate for other information, such as selection indictors. In an example, a first selection indicator 656 for the first email item 608, a second selection indicator 658 for the second email item 610, a third selection indicator 660 for the third email item 612, a fourth selection indicator 662 for the fourth email item 614, a fifth selection indicator 664 for the fifth email item 616, and a seventh selection indicator 668 for the seven email item 620 may be displayed (e.g., according to an unselected state) based upon the transition of the email item list 606 into the editing mode 654.

In an example, a select all action interface 670 may be displayed for the email item list 606, which may allow the user to select all email items within the email item list 606. In an example, an exit editing mode action interface 672 may be displayed, which may allow the user to transition out of the editing mode 654 (e.g., the selection indicators may be removed and/or the context indicators may be returned, such as expanded from the shrunken state, to an original size). In an example, an editing task bar 674 may be displayed within the current visual interface. The editing task bar 674 may be populated with various action interfaces, such as a mark as read action interface 676, a make favorite action interface 678, a move to folder action interface 680, a delete action interface 682, and/or other action interfaces.

Figure 6E:
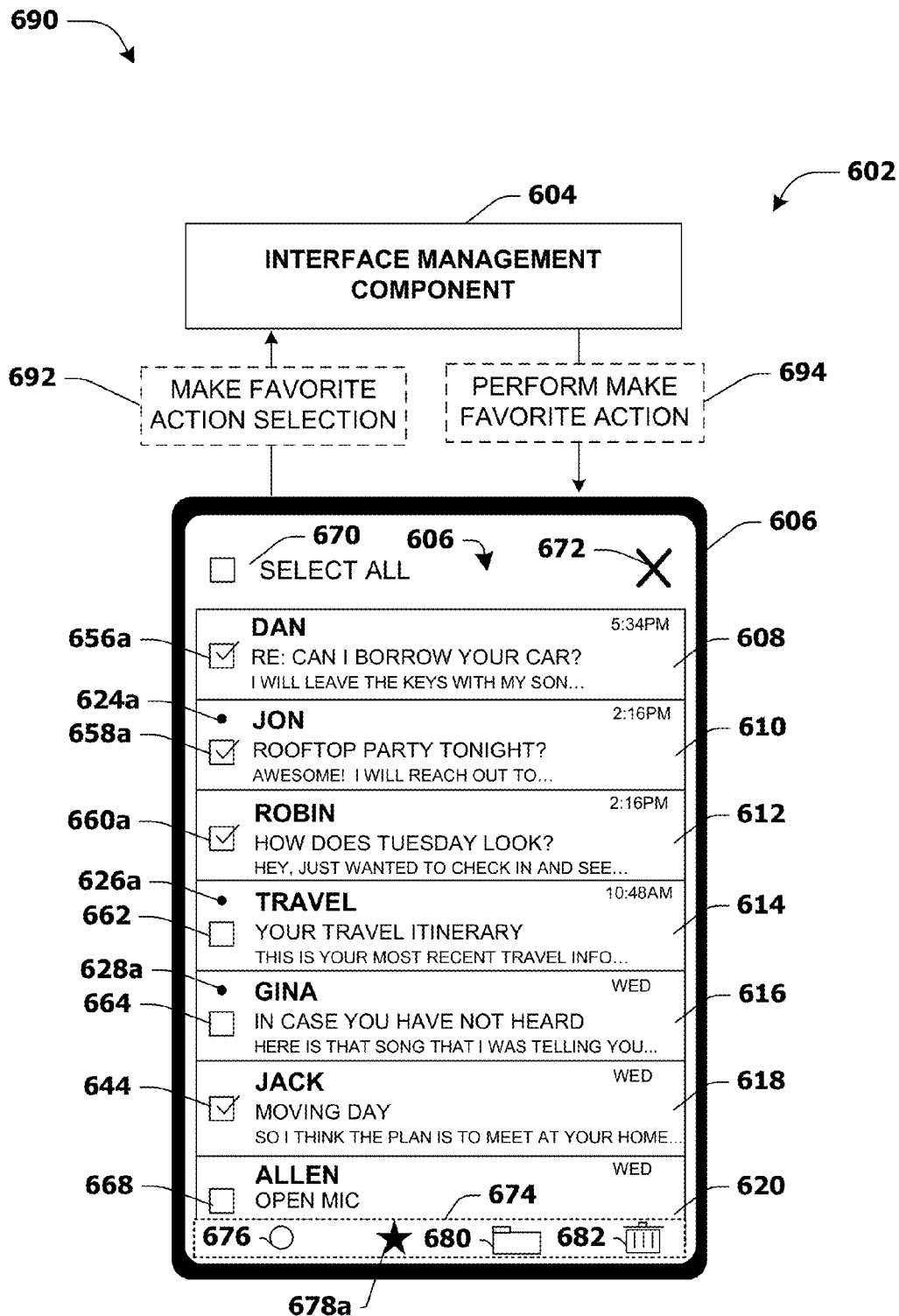
FIG. 6E is a component block diagram illustrating an exemplary system for item selection, where an action is performed for one or more selected items of an item list.

FIG. 6E illustrates an example 690 of the interface management component 604 performing 694 a make favorite action. For example, the user may select the first selection indicator 656 to select the first email item 608, resulting in a first selection indicator 656a displayed according to a selected state. The user may select the second selection indicator 658 to select the second email item 610, resulting in a second selection indicator 658a displayed according to the selected state. The user may select the third selection indicator 660 to select the third email item 612, resulting in a third selection indicator 660a displayed according to the selected state. The user may invoke the make favorite action interface 678 (e.g., invoked favorite action interface 678a), which may be identified as a make favorite action interface selection 692 by the interface management component 604. Accordingly, the interface management component 604 may apply a favorite status to one or more selected email items, such as the first email item 608, the second email item 610, the third email item 612, and the sixth email item 618.

Figure 7:
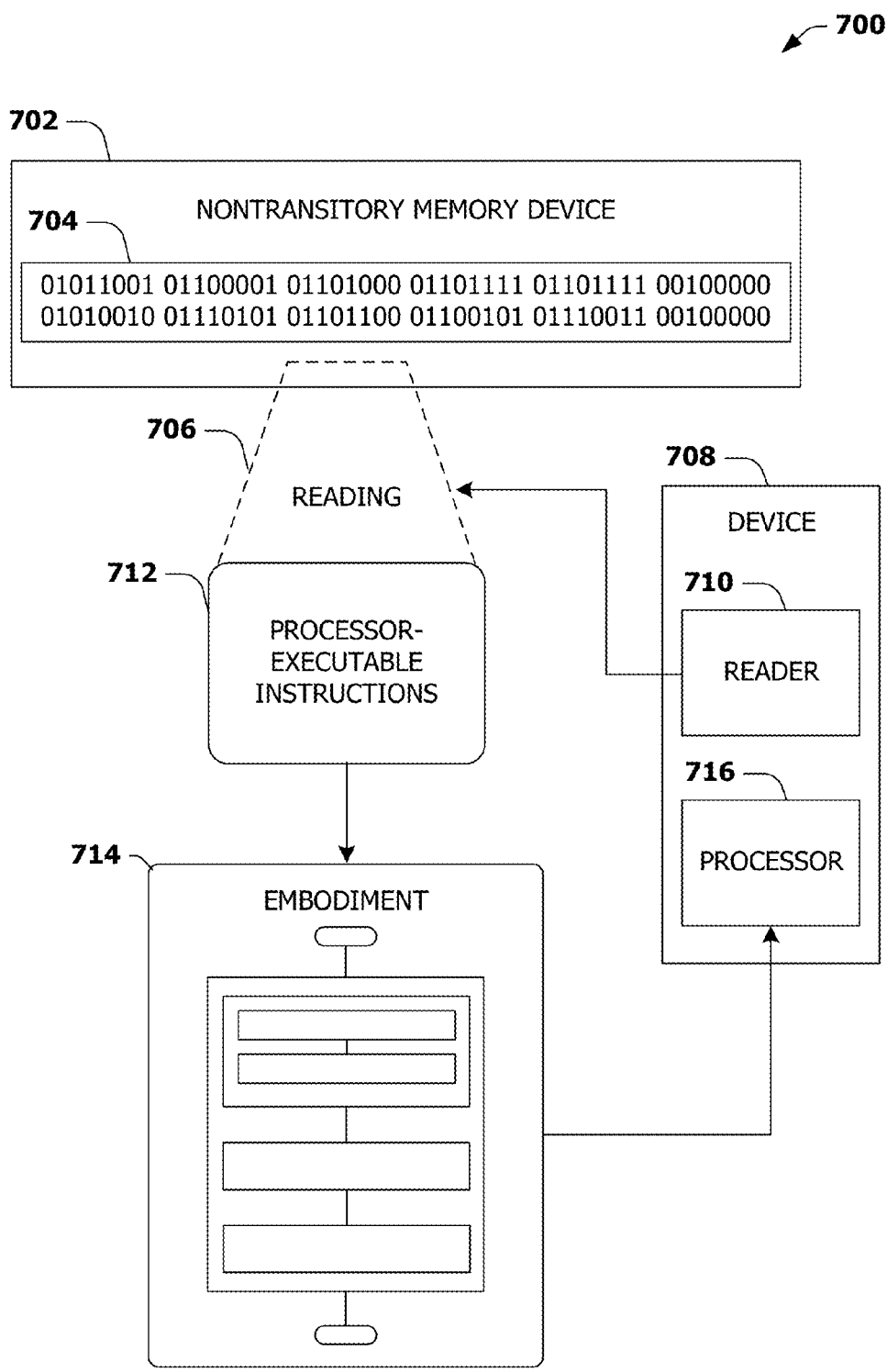
FIG. 7 is an illustration of a scenario featuring an exemplary nontransitory memory device in accordance with one or more of the provisions set forth herein.

FIG. 7 is an illustration of a scenario 700 involving an exemplary nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The exemplary nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the exemplary method 400 of FIG. 4, for example. In some embodiments, the processor-executable instructions, when executed on the processor 716 of the device 708, are configured to implement a system, such as at least some of the exemplary system 602 of FIGS. 6A-6E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The invention claimed is:

1. A method for item selection, comprising:
displaying a current visual interface comprising an item list, the item list comprising a first item and a second item;
displaying, in a second portion of the current visual interface corresponding to the second item, a second context indicator for the second item;
responsive to receiving gesture input comprising a single gesture directed to the first item and not the second item:

selecting the first item and displaying, in a first portion of the current visual interface corresponding to the first item, a first selection indicator, indicative of a selected state, for the first item;
decreasing a size of the second context indicator for the second item to generate a modified second context indicator;
generating a second selection indicator, indicative of an unselected state, associated with the second item; and
displaying, in the second portion of the current visual interface corresponding to the second item, the second selection indicator concurrently with the modified second context indicator instead of the second context indicator; and
responsive to receiving a selection of the second selection indicator associated with the second item, selecting the second item and displaying, in the second portion of the current visual interface corresponding to the second item, a modified second selection indicator indicative of the selected state instead of the second selection indicator.

2. The method of claim 1, the decreasing performed at least one of without decreasing a size of the second portion of the current visual interface corresponding to the second item or without decreasing a size of one or more other components of the second portion of the current visual interface corresponding to the second item.

3. The method of claim 1, comprising:
responsive to receiving the gesture input associated with the first item, transitioning the item list into an editing mode.

4. The method of claim 3, comprising:
receiving a selection input of one or more items within the item list while the item list is within the editing mode, resulting in one or more selected items; and
performing an action upon the one or more selected items.

5. The method of claim 4, the action comprising at least one of a delete action, a mark as read action, a move to destination action, or an item action.

6. The method of claim 1, the displaying a current visual interface comprising:
displaying a context indicator for a third item within the item list; and
responsive to transitioning the item list into an editing mode based upon the gesture input, modifying the context indicator to create a modified context indicator displayed for the third item.

7. The method of claim 6, the context indicator indicating whether the third item is read or unread.

8. The method of claim 1, comprising:
responsive to receiving the gesture input associated with the first item, modifying a display position of the first item from an original display position to a modified display position based upon a gesture direction of the gesture input.

9. The method of claim 1, the gesture input comprising a swipe input.

10. The method of claim 1, comprising:
responsive to receiving the gesture input associated with the first item, displaying action text for the first item.

11. The method of claim 1, comprising:
maintaining display of the item list through the current visual interface during the gesture input.

12. The method of claim 3, comprising:
responsive to transitioning the item list into the editing mode, displaying an editing task bar within the current visual interface.

13. The method of claim 6, comprising:
responsive to transitioning the item list into the editing mode, displaying a selection indicator with the modified context indicator for the third item.

14. The method of claim 8, comprising:
responsive to identifying a gesture release, returning the first item to the original display position.

15. A system for item selection, comprising:
a processor; and
memory comprising processor-executable instructions that when executed by the processor cause implementation of an interface management component configured to:
display a current visual interface comprising an item list, the item list comprising a first item and a second item;
display, in a second portion of the current visual interface corresponding to the second item, a second context indicator for the second item; and
responsive to receiving gesture input directed to the first item and not the second item:
transition the item list into an editing mode and display at least one of a first selection indicator or action text for the first item;
modify a size of the second context indicator for the second item to generate a modified second context indicator at least one of without modifying a size of the second portion of the current visual interface corresponding to the second item or without modifying a size of one or more other components of the second portion of the current visual interface corresponding to the second item; and
display, in the second portion of the current visual interface corresponding to the second item, the modified second context indicator instead of the second context indicator.

16. The system of claim 15, the interface management component configured to:
display a context indicator for a third item within the item list; and
responsive to transitioning the item list into the editing mode, modify the context indicator to create a modified context indicator displayed for the third item.

17. The system of claim 15, the interface management component configured to:
maintain display of the item list through the current visual interface during the gesture input.

18. The system of claim 15, the interface management component configured to:
responsive to receiving the gesture input associated with the first item, display an action graphic for the first item.

19. The system of claim 15, the interface management component configured to:
responsive to receiving the gesture input associated with the first item, modify a display position of the first item from an original display position to a modified display position based upon a gesture direction of the gesture input.

20. A nontransitory memory device storing instructions that, when executed on a processor of a server, cause the server to perform operations for item selection comprising:

displaying a current visual interface comprising an item list, the item list comprising a first item and a second item;
displaying a first context indicator for the first item;
displaying a second context indicator for the second item; and
responsive to receiving gesture input directed to the first item and not the second item:
  selecting the first item;
  transitioning the item list into an editing mode;
  modifying a size of the first context indicator for the first item to generate a modified first context indicator;
  modifying a size of the second context indicator for the second item to generate a modified second context indicator;
  displaying the modified first context indicator instead of the first context indicator;
  displaying the modified second context indicator instead of the second context indicator;
  displaying a first selection indicator, different than the first context indicator, for the first item; and
  displaying a second selection indicator, different than the second context indicator, for the second item.

* * * * *